United States Patent [19]

Proctor et al.

[11] Patent Number: 5,123,021
[45] Date of Patent: Jun. 16, 1992

[54] MESSAGE ROUTING CHECK SYSTEM

[75] Inventors: Richard J. Proctor; Geoffrey Chopping; Thomas S. Maddern, all of Wimborne, United Kingdom

[73] Assignee: GEC Plessey Telecommunications Limited, England

[21] Appl. No.: 568,039

[22] Filed: Aug. 16, 1990

[30] Foreign Application Priority Data

Sep. 18, 1989 [GB] United Kingdom ............ 8921082

[51] Int. Cl.⁵ ............................................. G06F 11/00
[52] U.S. Cl. ..................................... 371/71; 371/20.1
[58] Field of Search ................. 371/71, 67.1, 68.2, 371/24, 20.1, 20.4; 370/13, 14

[56] References Cited

U.S. PATENT DOCUMENTS

| | | | |
|---|---|---|---|
| 3,909,562 | 9/1975 | Lager | 370/13 |
| 4,376,999 | 3/1983 | Abbott | 371/71 X |
| 4,542,507 | 9/1985 | Read | 370/13 X |
| 4,561,090 | 12/1985 | Turner | 370/13 X |
| 4,995,042 | 2/1991 | Guthaus | 371/68.2 |

OTHER PUBLICATIONS

"Method and Arrangement for Testing Switch-Network Components", IBMTDB, vol. 31, No. 8, Jan. 1989, pp. 414-427.

*Primary Examiner*—Robert W. Beausoliel
*Attorney, Agent, or Firm*—Kirschstein, Ottinger, Israel & Schiffmiller

[57] ABSTRACT

A telecommunication apparatus in which data messages are routed across a switch, each message comprising a message portion and an incoming message identity portion, includes circuitry for generating from the incoming message identity portion an outgoing message identity portion, a switching circuit for utilizing the incoming and outgoing message identity portions to route the message to an output port, circuitry for utilizing the outgoing message identity portion to generate a further message identity portion, and comparator circuitry for comparing the incoming and further message identity portions to detect faults.

5 Claims, 2 Drawing Sheets

MESSAGE ROUTING CHECK SYSTEM

BACKGROUND OF THE INVENTION

The present invention concerns communication systems in which messages are sent across a switching medium. The invention is particularly applicable to sending digital data by Time Division Multiplex (TDM) and to use in the Integrated Services Digital Networks (ISDN) currently being introduced. It also has applications in message switches including packet switches, ATM switches and frame relaying switches.

In an ISDN system, as in many other systems, incoming messages to a switching medium have to be translated into outgoing messages. The present invention is concerned with systems in which this translation is carried out with reference to a mapping function, that is the incoming message is used to access an address of a stored map which gives the necessary route across the switching medium. The incoming message may include a portion which identifies its intended destination and which along with its entry point in the system be used to access the local map. It is however possible merely for the entry port at which the incoming message appears to be the determining factor in assessing the local map.

Prior systems utilizing local maps for message routing across a switching medium have all had the considerable disadvantage that fault detection is extremely difficult.

SUMMARY OF THE INVENTION

The present invention is concerned with alleviating the above problem.

Accordingly from one aspect the invention comprises a method of switching messages across a switching medium in which each incoming message comprises a message portion and an incoming message identity portion, the method including generating from the incoming message identity portion an outgoing message identity portion, utilizing the incoming and outgoing message identity portions to route the message across a switching medium, utilizing the outgoing message identity portion to generate a further message identity portion, and comparing the incoming and further message identity portions to detect faults.

Preferably each incoming message identity portion is associated with an incoming connection number which is also utilized in the routing of the message portion across the switching medium. In such a case the generation of the outgoing message identity portion also involves the generation of an outgoing connection number.

From a second aspect the invention also comprises a circuit for carrying out the above identified method.

BRIEF DESCRIPTION OF THE DRAWINGS

In order that the present invention may be more readily understood, an embodiment thereof will now be described by way of example and with reference to the accompanying drawings, in which:

Referring now to FIG. 1 of the accompanying drawings this is a flow diagram illustrating the sequence of events in a known Message Switching System.

An incoming message block is shown at 10. This message block consists of two parts, namely a message identity part A and an information part B. The message identity part is used, together with an incoming connection number C, by a translation circuit 11 to address a local map so as to generate an outgoing message identity shown at D and an outgoing connection number E. This message block is shown at 12. The outgoing message identity and outgoing connection number are used to switch the message appropriately in a switch indicated at 13. In the particular flow diagram being described the incoming and outgoing connection numbers C and E are respectively the ports at which the message is initially received and subsequently transmitted. The final outgoing message shown at 14 thus consists of an outgoing message identity portion part D and the original information part B.

The problem with this sequence of events is that there is no way of checking that the information part has been correctly switched across the switch.

Figure 1:
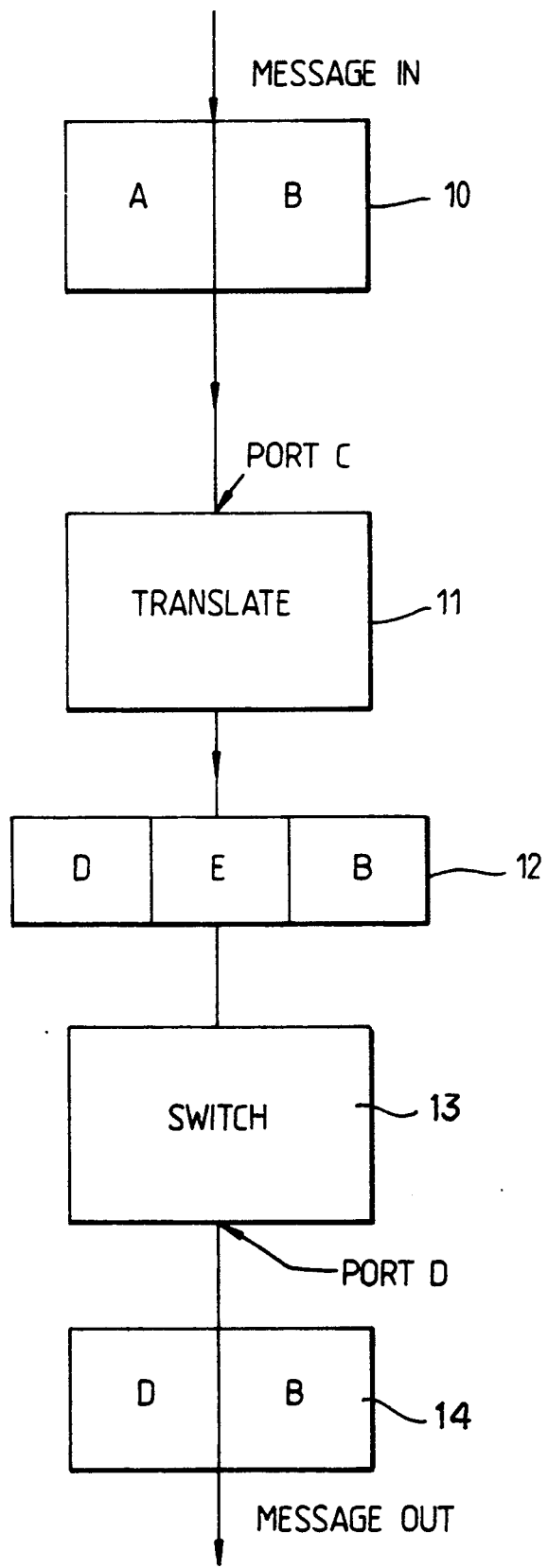
FIG. 1 is a flow diagram of a known switching system according to the Prior Art.
Figure 2:
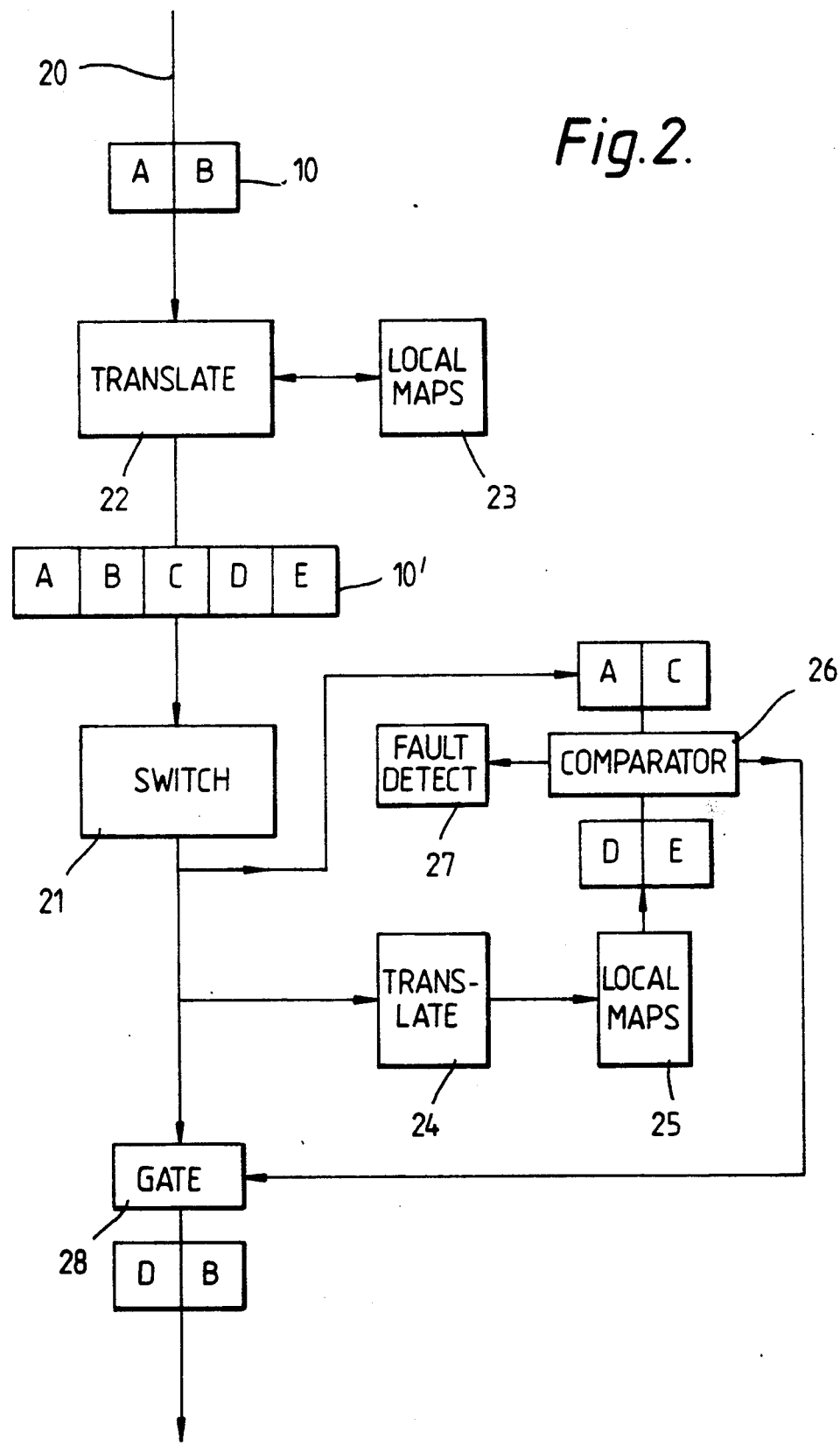
FIG. 2 is a block diagram of a message switching system according to the present invention.

Referring now to FIG. 2 of the drawings, this shows a digital message arriving on a line 20 for switching by a switch 21. The message is as illustrated in block 10 and as on FIG. 1 consists of a message identity portion A and information B. In a digital switching network such as a telephone exchange messages will be arriving at a large number of ports and as explained the incoming connection or port number, in the present example, C, and the message identity portion A are used to determine the route of the message information across the switch 21. This is done by means of a translation circuit 22 which uses the message identity part A and the port number C to address a local map 23. The local map 23 is essentially a large memory array which when accessed by the translation circuit 22 maps the incoming message identity A and connection number C to generate the requisite routing information for the message to be transmitted across the switch 21.

The output of the translation circuit 22 after the mapping function has been carried out is shown at block 10' and includes the original message identity portion A, the original information B, the port number C, a new, outgoing message identifying portion D, and an outgoing port number E. This message block accordingly consists of A, C, which tells where the message has come from D, E, where the message is going, and B, the message itself. This message block is switched across switch 21 to the output port corresponding to outgoing port number E. The new message block is supplied to a translation circuit 24. This translation circuit 24 acts on the outgoing message identifying portion D and outgoing port number E in a manner similar to translation circuit 22, that is message parts D and E are used to access a local map 25 to generate what is in effect an outgoing message identity portion and outgoing port number. However the new outgoing message identity and connection portions are merely for use in checking the routing of the switch. Thus the translation circuit 24 and local maps 25 are so arranged that they carry out the converse of the operation carried out by translation circuit 22 and local maps 23. Accordingly if the message block has been correctly switched across switch 21 the translation of message identity D and connection number E will give the original message identity A and connection number C.

To check whether this is the case or not the output of translation circuit 24 is supplied to a comparator 26 where A, C is compared to D, E. If there is no match this information is given to a fault detect circuit 27, whilst if there is a match a gate 28 is enabled to allow the message B and the new message identity D to pass.

By the arrangement shown in FIG. 2 several different types of error can be detected. If the maps at 23 are wrong, then the cross check would fail as D, E, would not be the same as A, C.

Similarly if the maps at 25 are wrong, then the cross check would fail as D, E, again would be different from A, C.

If the switch 21 miss routed or corrupted the message, then the cross check would fail as again A, C, and D, E, would be different.

Whilst the circuit described does not in itself distinguish between the type of faults, other checks may be performed to determine the exact cause of the error. For instance, the maps are likely to relate to a call, and the correct state of the connection according to the call handling be determined and compared with the local maps. If the map at 23 was wrong, then that would fail its check, if the maps at 25 were wrong then that would fail the check, if both where correct, then the most likely fault is the switch 21 itself. There is the possibility that both were wrong, which would suggest that the path has not been correctly set-up in the first place.

We claim:

1. Telecommunication apparatus for switching messages each comprising a message portion and an incoming message identity portion, the apparatus comprising:
   a) means for generating from the incoming message identity portion an outgoing message identity portion;
   b) means including a switch utilizing the incoming and outgoing message identity portions to route the message to an output port;
   c) means for utilizing the outgoing message identity portion to generate a further message identity portion; and
   d) means for comparing the incoming and further message identity portions to detect faults.

2. Apparatus as claimed in claim 1, wherein the means for generating said outgoing message identity, portion comprise a first translation circuit and a local map array.

3. Apparatus as claimed in claim 2, wherein the means for utilizing the outgoing message identity portion comprise a second translation circuit and a further local map array associated with the second translation circuit.

4. Apparatus as claimed in claim 3, wherein the comparing means includes a comparator for comparing the incoming message identity portion with the further message identity portion, and a fault detect circuit for detecting if the two portions are not identical.

5. Telecommunication apparatus for switching messages through a switch, each message comprising a message portion and an incoming message identity portion, the apparatus comprising:
   a) an input port for a message to be switched;
   b) a first translation circuit associated with a first local map array for generating an outgoing message identity portion for said message in response to said incoming message identity portion;
   c) a switch for routing said message to an output port in response to said outgoing message identity portion;
   d) a second translation circuit associated with a second local map array for generating a further message identity portion in response to said outgoing message identity portion; and
   e) comparator means for comparing said incoming and said further message identity portions.

* * * * *